(12) United States Patent
LeWark, Sr.

(10) Patent No.: US 8,721,776 B2
(45) Date of Patent: May 13, 2014

(54) MANUFACTURING SYSTEMS WITH REACTOR UNITS

(75) Inventor: Blaise A. LeWark, Sr., Port Orchard, WA (US)

(73) Assignee: Mektech Composites Inc., Hillsdale, NJ (US)

( * ) Notice: Subject to any disclaimer, the term of this patent is extended or adjusted under 35 U.S.C. 154(b) by 145 days.

(21) Appl. No.: 13/143,532

(22) PCT Filed: Jan. 14, 2010

(86) PCT No.: PCT/US2010/021062
§ 371 (c)(1),
(2), (4) Date: Jul. 6, 2011

(87) PCT Pub. No.: WO2010/083323
PCT Pub. Date: Jul. 22, 2010

(65) Prior Publication Data
US 2011/0272359 A1     Nov. 10, 2011

Related U.S. Application Data

(60) Provisional application No. 61/144,681, filed on Jan. 14, 2009.

(51) Int. Cl.
*B01D 53/02* (2006.01)
*B01D 53/44* (2006.01)
*B01D 53/74* (2006.01)

(52) U.S. Cl.
USPC .................. 96/132; 95/141; 96/135; 96/153; 422/170; 422/171; 422/177

(58) Field of Classification Search
USPC ......... 95/90, 141; 422/168–171, 177; 96/132, 96/135, 153
See application file for complete search history.

(56) References Cited

U.S. PATENT DOCUMENTS 4,072,479 A * 2/1978 Sinha et al. ..................... 95/136
6,203,762 B1 * 3/2001 Skalla et al. .................. 422/171

OTHER PUBLICATIONS

"GSA Resources Inc. Product Data Sheet—ZS500KMn04 and ZK406KMn04 Air Filtration Media," XP002584003, Dec. 2, 1998, URL = http://webarchive.org/web/19990418070441/http://www.gsaresources.com/pds_kmn.ht, download date May 25, 2010, 3 pages.
"Filter Innovations Inc. HS-600 Material Safety Data Sheet," XP002584004, Mar. 6, 2008, URL = http://www.filterinnovations.com/msds_sheets/specialty-media/HS600.pdf, download date May 18, 2010, 2 pages.
International Search Report and Written Opinion, mailed Sep. 9, 2010, for PCT/US2010/021062, 18 pages.

* cited by examiner

*Primary Examiner* — Duane Smith
*Assistant Examiner* — Joubert X Glover
(74) *Attorney, Agent, or Firm* — Perkins Coie LLP

(57) ABSTRACT

A reactor unit includes a bed of desiccant and a bed of media for treating pollutants. The media includes an adsorptive material and a reactive material. The adsorptive material is selected from at least one of activated carbon and zeolite. The reactive material is selected from at least one of potassium permanganate and sodium hydroxide. The adsorptive material is impregnated with reactive materials to enhance performance. A method of using the reactor unit includes delivering a moldable material into a mold. An effluent stream carrying pollutants produced by the moldable material flows through the reactor unit.

15 Claims, 4 Drawing Sheets

MANUFACTURING SYSTEMS WITH REACTOR UNITS

CROSS-REFERENCE TO RELATED APPLICATION

This application claims the benefit under 35 U.S.C. §119(e) of U.S. Provisional Patent Application No. 61/144,681 filed Jan. 14, 2009. This provisional application is incorporated herein by reference in its entirety.

BACKGROUND

1. Technical Field

The present disclosure generally relates to manufacturing systems, and more specifically, to manufacturing systems with reactor units.

2. Description of the Related Art

Conventional manufacturing processes often generate byproducts that pollute the surrounding atmosphere and often present health risks. Phenolic resins, styrenated resins, and styrene derivative resins are commonly used manufacturing materials that produce such unwanted byproducts. Workers often wear respirators for protection from such pollutants. Unfortunately, respirators may malfunction, may not adequately remove pollutants, and may be relatively expensive. Additionally, it may be difficult to dispose of the pollutants because the pollutants may be unsuitable for venting to the atmosphere.

BRIEF SUMMARY

At least some embodiments disclosed herein are directed to manufacturing systems capable of managing emissions of pollutants. Manufacturing processes can generate byproducts that may pollute the atmosphere. Such byproducts may include toxic fumes that may require workers to wear respiratory equipment, such as a respirator. To manage the emission of pollutants, the manufacturing system includes a reactor unit that collects or otherwise reacts with pollutants. A wide range of different types of pollutants can be neutralized within the reactor unit such that the reactor unit outputs harmless gases suitable for breathing.

If the manufacturing process is an infusion process involving phenolic resins, the reactor unit reduces free formaldehyde to yield harmless vapor (e.g., water vapor) and carbon dioxide. An in-line pump, in some embodiments, can draw gases produced during a curing process through the reactor unit. The reactor unit contains a surface treated substrate for collecting and/or chemically reacting with pollutants, such as free formaldehyde.

In some embodiments, a reactor unit includes a plurality of beds for treating a fluid flow. The reactor unit includes a desiccant bed and a reactive bed. The desiccant bed reduces the humidity of the fluid flow. The reactive bed has a collector material and a reactive material. The collector material is selected from at least one of activated carbon and zeolite. The reactive material is selected from at least one of permanganate and sodium hydroxide. In some embodiments, the reactive bed is configured to reduce by at least 90%, 95%, or 99% by weight of a pollutant in the fluid flowing through the reactor unit. A sufficient amount of collector material can be used to achieve the desired outputted fluid.

The reactive bed reacts with most of the pollutants in the fluid flow within an empty bed contact time of less than about 30 seconds, 15 seconds, 10 seconds, or 5 seconds. The reactive bed, in some embodiments, includes at least one of zeolite impregnated with potassium permanganate and activated carbon impregnated with sodium hydroxide. In some embodiments, the reactive bed includes a mixture of zeolite impregnated with potassium permanganate and activated carbon impregnated with sodium hydroxide.

In some embodiments, a manufacturing system includes a mold configured to form a molded article, a reactor unit, and an exhaust line. The reactor unit includes media made of a collector material and a reactive material. The collector material is selected from at least one of activated carbon and zeolite. The reactive material is selected from at least one of potassium permanganate or sodium hydroxide. Fluid from the mold can flow through the exhaust line to the reactor unit. The reactor unit treats the fluid to reduce a concentration of pollutants in the fluid.

The reactor unit, in some embodiments, has a sufficient amount of the reactive material to remove pollutants from an affluent stream passing through an exhaust line to output a stream from the reactor unit that comprises less than about 80%, 90%, or 99% of the pollutants by weight in the stream. In some embodiments, the reactive material removes at least about 99% of the pollutants by weight in the affluent stream to produce a substantially pollutant-free stream with a concentration of contaminates that is less than about 1 ppm, 100 ppb, or 50 ppb. The pollutant-free stream can be vented to atmosphere.

In other embodiments, a method of managing pollutants in a fluid is provided. The method includes passing fluid through a reactor unit for an empty bed contact time of more than about 2 seconds, 5 seconds, 10 seconds, or 20 seconds, or ranges encompassing such contact times. The reactor unit includes an adsorptive material for reacting with one or more pollutants in the fluid. In certain embodiments, moldable material in a mold is delivered into a mold. Pollutants emitted from the moldable material are delivered to the reactor unit. The mold can be a resin transfer mold, a compression mold, an injection mold, or a mold of a spray-up apparatus. The pollutants may be emitted from the moldable material before, during, or after curing of the moldable material.

The reactor unit removes a pollutant from the fluid flow so as to reduce a concentration of the pollutant to less than about 1 ppm, 0.5 ppm, 0.3 ppm, or 100 ppb. In some embodiments, the reactor unit reduces the concentration of the pollutant to less than about 50 ppb, 10 ppb, 5 ppb, or 3 ppb. The pollutant is selected from at least one of styrene, formaldehyde, and phenol. In some embodiments, the pollutant is gaseous styrene, gaseous formaldehyde, and/or gaseous phenol. The fluid delivered to the reactor unit can be an effluent stream of air and a gaseous pollutant.

In yet other embodiments, a method includes delivering a moldable material into a mold. An effluent stream with pollutants produced by the moldable material is contacted with a media. The media, in some embodiments, includes an adsorptive material and/or a reactive material. The adsorptive material is selected from at least one of activated carbon and zeolite. The reactive material is selected from at least one of potassium permanganate and sodium hydroxide. In certain embodiments, the moldable material includes one or more thermoplastics, thermosets, rubbers, or other polymer materials. In some embodiments, the moldable material includes one or more phenolic resins, styrenated resins, or styrene derivative resins.

In some embodiments, an air treatment system includes a pressurization device that draws a gas through a filter. As gases are drawn through the filter, the filter can process contaminants by using chemical reactions, absorption, adsorption, combinations thereof, or the like. The gas exiting the filter can contain an appropriate level of contaminants so that the filtered gas can be vented to the atmosphere. The filter can include one or more beds through which the gases flow.

In some embodiments, a reactor unit includes a reactive material that is adapted to remove at least one of styrene, formaldehyde, and phenols from a fluid passing through the reactor unit. In certain embodiments, the reactive material removes substantially all styrene, formaldehyde, phenols, and/or related byproducts to output pollutant-free air. The reactive material comprises potassium permanganate, sodium hydroxide, or mixtures thereof. In certain embodiments, a bed comprises at least one of zeolite with potassium permanganate and activated carbon with sodium hydroxide.

DETAILED DESCRIPTION

Figure 1:
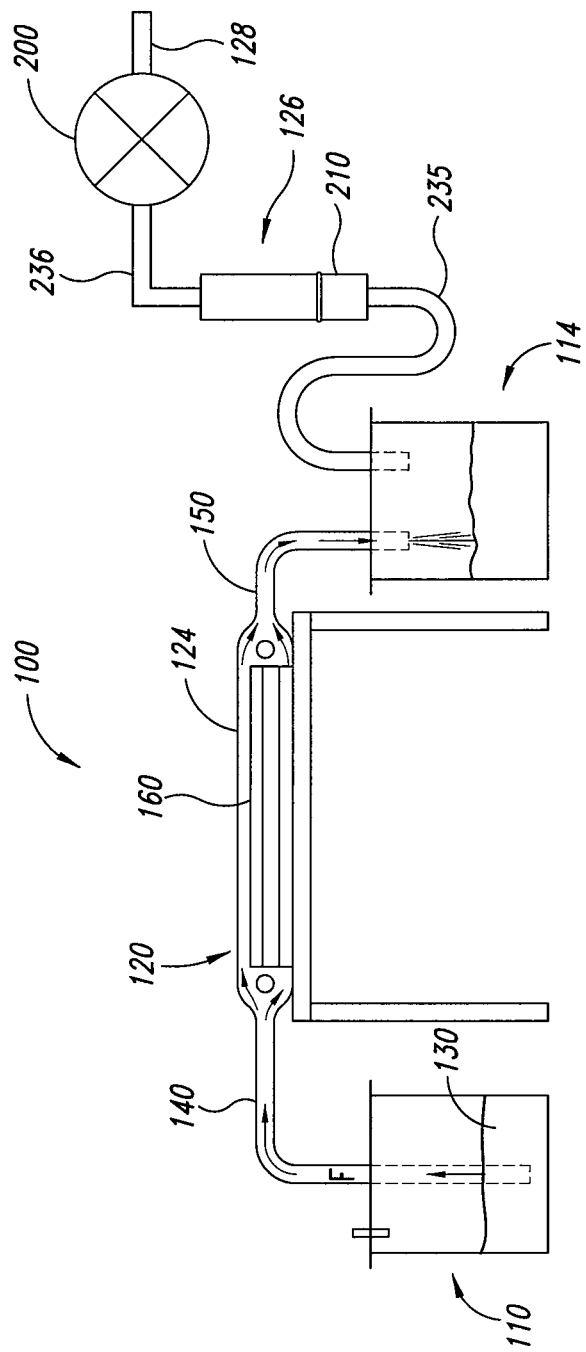
FIG. 1 is an elevational view of a manufacturing system having a reactor unit, in accordance with one embodiment.

FIG. 1 shows a manufacturing system 100 that includes a feed tank 110, a collection tank 114, and a mold 120 for receiving moldable material 130 from the feed tank 110 and delivering the moldable material 130 to the collection tank 114. Pollutants in the tank 114 are drawn into a treatment system 126. A reactor unit 210 of the system 126 removes pollutants in an exhaust stream (e.g., a stream of fumes and air) before exhausting the stream to the atmosphere via a vent 128. The treatment system 126 can keep emissions of pollutants at or below a desired level.

The moldable material 130 can be a thermoset, thermoplastic, elastomer, rubber, or the like. Exemplary thermosets include, but are not limited to, epoxy, phenolic resins, melamine-formaldehyde, urea-formaldehyde, polyesters, vinyl toluene, and vinyl esters. These materials can emit byproducts during processing (e.g., curing). The moldable material 130 in the tank 110 can flow through a feed line 140 into the mold 120. The moldable material 130 exits the mold 120 via an output line 150 and is collected in the tank 114. The tanks 110, 114 can be any type of tank (e.g., pressurizable or non-pressurized tank), reservoir, open or closed containers, etc.)

The mold 120 includes a flexible container 124 for containing a part 160 that is infused with the moldable material 130. The moldable material 130 can flow through the container 124 in order to thoroughly coat, infuse, or otherwise contact the part 160. The container 124 can be a bag or other suitable structure used to transfer the moldable material 130 to the part 160. The part 160 can include, without limitation, one or more reinforcements, sheets (e.g., woven sheets), substrates (e.g., porous substrates, semi-permeable substrates, permeable substrates, or the like), or other structures suitable for making a composite structure (e.g., a laminate, a fiber reinforced composite, or the like).

A wide range of different types of pollutants can be produced during the manufacturing process and may be gases (e.g., vapors), liquids, liquid/gas mixtures, particulate matter, or the like. The reactor unit 210 can absorb, adsorb, chemically react with, or otherwise interact with pollutants to minimize, limit, or substantially eliminate pollutants exiting the reactor unit 210. Pollutants may include formaldehyde, phenols, styrene, catalysts (e.g., catalysts used during curing), toxic fumes, solvent gases, inorganic gases, organic gases, or other byproducts of the manufacturing process. If the moldable material 130 is a phenolic resin, the reactor unit 210 can control emissions of formaldehyde and phenols emitted during curing. If the moldable material 130 is a styrenated resin, the reactor unit 210 can control emissions of gases emitted by the styrene. If the reactor unit 210 becomes ineffective at removing pollutants, it can be recharged or replaced.

The treatment system 126 further includes a pressurization device 200 (e.g., an in-line pump, plurality of pumps, a fan, a blower, etc.) that can draw a fluid through the treatment system 126. The pressurization device 200 is downstream of the reactor unit 210 and draws fluids through an exhaust feed line 235, the reactor unit 210, and an exhaust output line 236. The exhaust feed line 235 and exhaust output line 236 can be one or more hoses (e.g., a single lumen hose, a multi-lumen hose, etc.), conduits, tubes, or the like. The mold 120 can be in the form of an injection mold, a compression mold, a vacuum mold, a lay-up mold, or the like. Alternatively, the pressurization device 200 can be positioned upstream of the reactor unit 210 to push fluid through the reactor unit 210. The pressure produced by the pressurization device 200 can be selected based on whether the exhaust feed line 235 is coupled to the tank 114, the mold 120, or another component.

Figure 2:
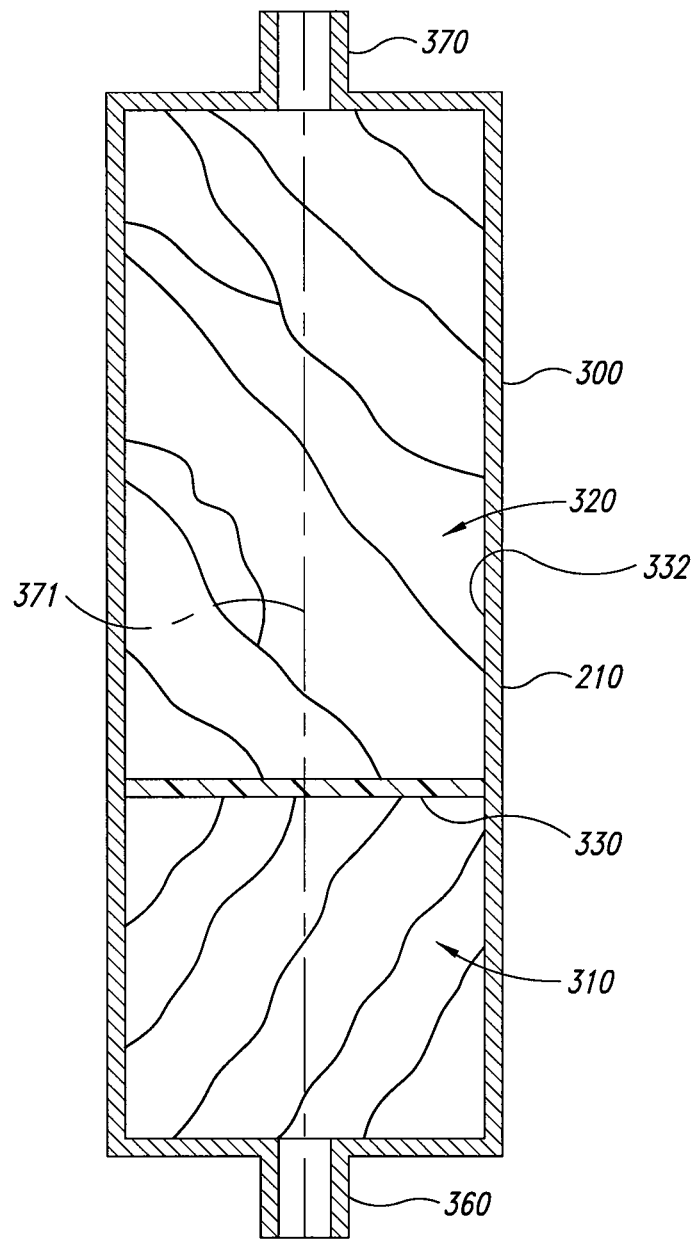
FIG. 2 is a cross-sectional view of the reactor unit in FIG. 1.

FIG. 2 is a cross-sectional view of the reactor unit 210. The reactor unit 210 includes a housing 300, an upstream bed 310, and a downstream bed 320. The housing 300 defines a fluid flow path 371 (illustrated in dashed line) extending from an inlet 360 to an outlet 370. The beds 310, 320 are within the housing 300 and are positioned along the flow path 371. Each bed 310, 320 includes media for processing a fluid flow (e.g., an effluent stream exiting the mold 120). A partition 330 separates the beds 310, 320. The partition 330 can be a permeable or semi-permeable element through which a fluid can flow. In the illustrated embodiment, the partition 330 separates the beds 310, 320 and is fixed to an inner surface 332 of the housing 300. In some embodiments, the partition 330 is integrally formed with the housing 300.

The partition 330 can comprise one or more membranes, filter elements, screens, meshes, combinations thereof, or the like. The partition 330 can keep media in the beds 310, 320 separate while allowing fluid flow therethrough. The position and characteristics of the partition 330 can be selected based on the material in the beds 310, 320.

The bed 310 can remove substances from the fluid entering the inlet 360 to enhance performance of the bed 320. In some embodiments, water vapor is removed from gases entering the inlet 360 prior to delivering the gases to the bed 320. The bed 310 can include, without limitation, a desiccant that promotes drying. The desiccant can include, without limitation, calcium oxide, silica, combinations thereof, or other porous and/or crystalline substances capable of collecting water via adsorption and/or absorption. The amount and composition of the desiccant, fluid flow rate through the bed 310, and dimensions of the bed 310 can be adjusted to achieve a desired empty bed contact time.

The bed 320 can include, without limitation, one or more collecting substances (e.g., adsorbers and/or absorbers), reactive substances, or other substances suitable for reducing the concentration of pollutants. Collecting substances include, without limitation, carbon, zeolite, or other types of materials (e.g., solid materials with a high surface area, highly porous structure, or the like) that capture or otherwise retain pollutants. Zeolite can be natural zeolite, synthetic zeolite, or mixtures thereof. In some embodiments, the bed 320 is a molecular sieve made, in whole or in part of, a substrate treated (e.g., coated, impregnated, or infused) with a reactive substance. For example, the substrate can be granules of a collecting substance impregnated with a reactive material. The impregnated substrate absorbs, adsorbs, and/or chemically reacts with pollutants. The characteristics of the impregnated substrates (e.g., adsorption selectivity, particle density, molecular pore size, dimensions, or the like) can be selected based on the characteristics of the pollutants. Reactive materials include, without limitation, permanganate, sodium hydroxide, catalysts, or other substances capable of reacting with pollutants to convert the pollutants to desired substances by reduction, oxidation, or the like.

The bed 320 can comprise any number of different types of collecting substances. The bed 320, in some embodiments, comprises a single collecting substance. In other embodiments, the bed 320 can comprise a plurality of different types of collecting substances. For example, the bed 320 can comprise a stack of any number of different types of collecting substances that may or may not be separated by partitions. In other embodiments, the bed 320 comprises a generally homogeneous mixture of collecting substances.

A wide range of different techniques can be used to produce media. In some embodiments, reactive material is applied to a substrate (e.g., zeolite crystals or granular activated carbon) via a spraying process, impregnating process, immersing processes, coating processes, or the like. By way of example, an aqueous solution of a reactive material can be sprayed onto a substrate of a mesh size equal to or less than about 10. In some embodiments, potassium permanganate is applied to zeolite crystals with a mesh size in a range of about 4 to about 6 (U.S. mesh size). The potassium permanganate can be from about 6% to about 8% by weight of the combined weight of the potassium permanganate and the substrate, i.e., the weight of the media. The sodium hydroxide can be from about 5% to about 8% by weight of the combined weight of the sodium hydroxide and the substrate, i.e., the weight of the media. Other weight percentages are also possible.

In some embodiments, the bed 320 can both chemically react with and adsorb unwanted phenols. Phenolic resins can be formed by the reaction involving phenols and aldehydes and can emit harmful gases during curing. For example, phenols may be emitted during the curing process. Phenolic resins can be phenol formaldehyde resin (e.g., BAKELITE®) or other types of phenolic-based resins, including phenolic resole resins. Phenolic resole resins can be produced by the reaction of phenol and formaldehyde under alkaline conditions, with an excess of formaldehyde. To treat an effluent stream with phenols, the bed 320 can include zeolite impregnated with potassium permanganate. The potassium permanganate chemically reacts with phenols and the zeolite can adsorb the phenols. To treat an effluent stream with styrene (e.g., styrene-monomers), the bed 320 can include, without limitation, activated carbon impregnated with sodium hydroxide.

The bed 320 can include a blend. For example, the blend can comprise about 30% to 50% by volume of activated carbon impregnated with sodium hydroxide and about 50% to 70% by volume of zeolite impregnated with potassium permanganate. In one embodiment, the blend is about 40% by weight or volume of impregnated activated carbon and about 60% by weight or volume of impregnated zeolite. Such a blend is well suited to reduce formaldehyde to water vapor and carbon dioxide. The blend can be a homogeneous blend or heterogeneous blend.

In some embodiments, the reactor unit 310 is configured to remove pollutants so as to reduce the concentration of the pollutants to less than about 10 ppm, 500 ppb, 10 ppb, 5 ppb, 3 ppb, or ranges of such concentrations. In some embodiments, the empty bed contact time for the bed 320 is at least 5 seconds, 10 seconds, 20 seconds, 30 seconds, or ranges of such lengths of time. A wide range of different types of tests can be used to determine the concentration of the pollutants. In certain embodiments, the reactor unit 310 is configured to reduce the concentration of pollutants by at least 70%, 80%, 90%, 95%, 98%, or 99%. The empty bed contact time is the time the fluid spends in the bed 320 and is generally equal to the volume of the bed 320 divided by the flow rate of the fluid. The reactor unit 210 can further include one or more valves (e.g., check valves, pressure control valves, or the like), drains, or other components for controlling the flow of fluid through the unit 210 to achieve desired treatment capabilities.

Figure 3:
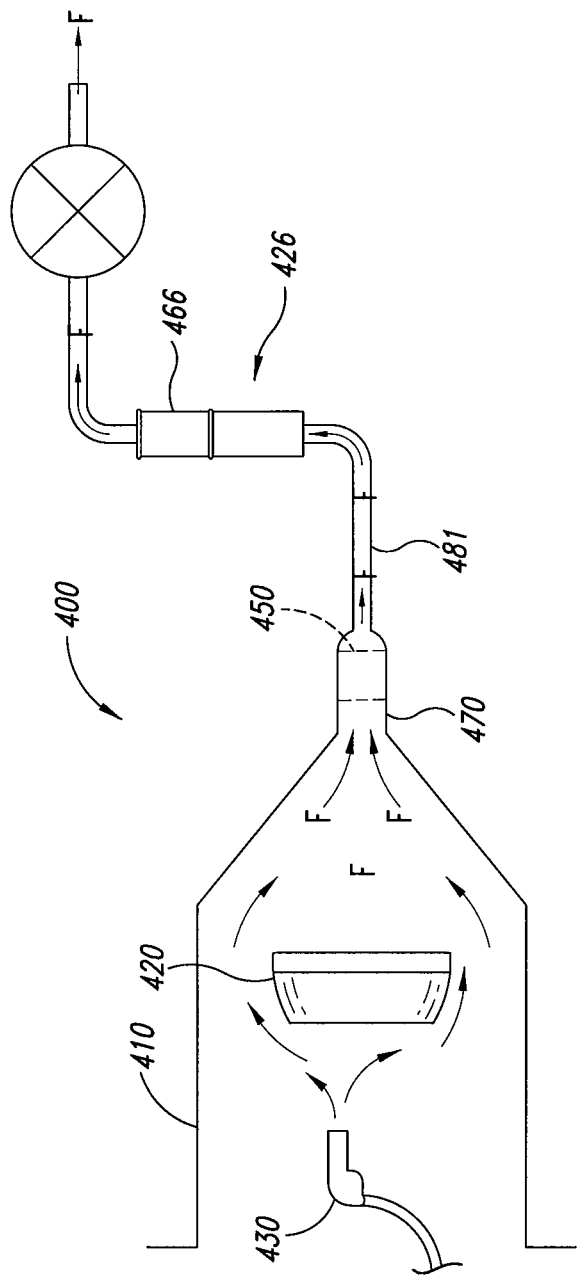
FIG. 3 is an elevational view of a manufacturing system having a reactor unit.

FIG. 3 shows a manufacturing system 400 that includes a spray booth 410 surrounding a mold 420, a sprayer 430, and a treatment system 426. In some embodiments, a pressurization device 450 (illustrated in dashed line) can be used to accelerate the fluid flow through a nozzle 470 of the booth 410 such that the fluid flows through a reactor unit 466 at a desired flow rate.

Reinforcement materials, catalysts, resins, fillers, or combinations thereof can be deposited on the surface of the mold 420 using the sprayer 430. Reinforcement material may include, without limitation, chopped plastics, fiberglass, or the like. The resin can be a thermoset resin, which can produce unwanted gases before, during, or after curing. Byproducts from the process can be drawn through an exhaust feed line 481 and can pass through the reactor unit 466.

Figure 4:
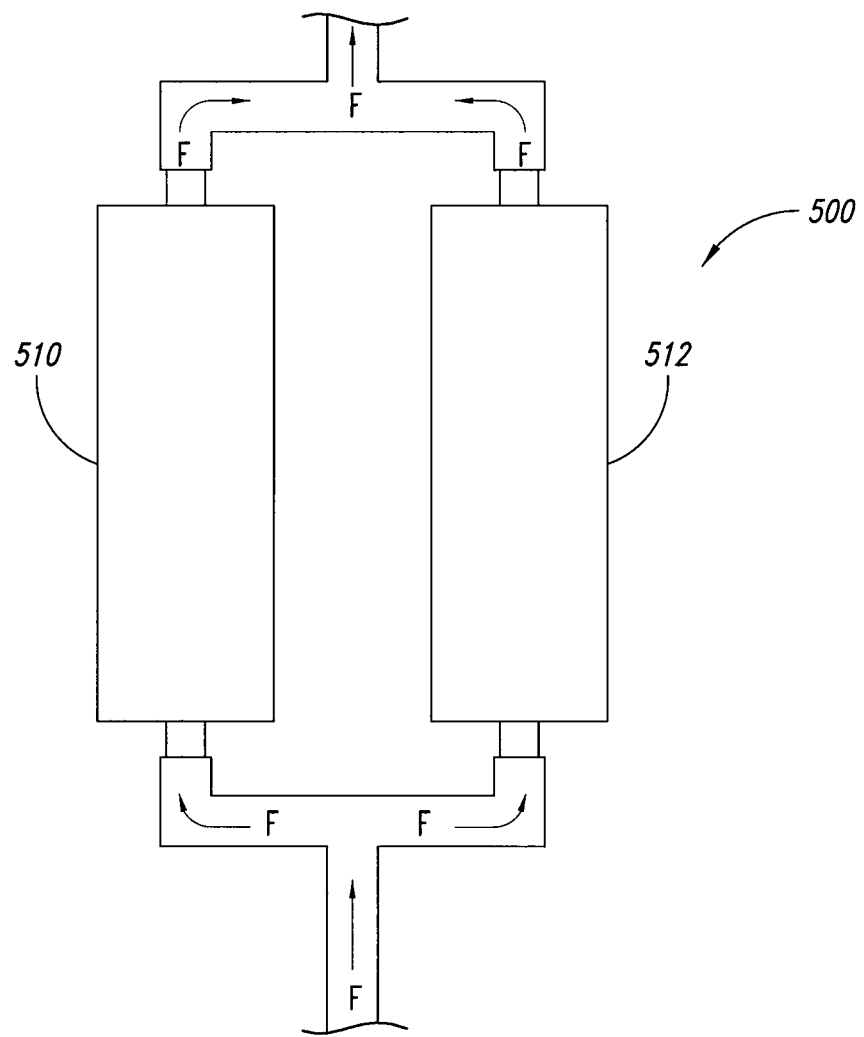
FIG. 4 is a side elevational view of a reactor apparatus with a pair of reactor units, in accordance with one embodiment.

Any number of reactor units can be arranged in parallel or in series. The number of reactor units can be increased or decreased to increase or decrease processing capacity. FIG. 4 shows a reactor apparatus 500 with a pair of reactor units 510, 512. The units 510, 512 can simultaneously treat an effluent stream with pollutants.

The reactor units and apparatuses disclosed herein can be incorporated into or used with a wide range of different types of vacuum forming systems (e.g., vacuum bag forming), infusion systems, resin transfer molding systems, injection molding systems, compression molding systems, extrusions systems, spray-up systems, hand lay-up systems, warm press molding systems, pultrusion systems, filament winding systems or the like.

Unless the context requires otherwise, throughout the specification and claims which follow, the word "comprise" and variations thereof, such as "comprises" and "comprising," are to be construed in an open, inclusive sense, that is as "including, but not limited to."

It should be noted that, as used in this specification and the appended claims, the singular forms "a," "an," and "the" include plural referents unless the context clearly dictates otherwise. For example, the term "a bed" includes a single bed and/or a plurality of beds. It should also be noted that the term "or" is generally employed in its sense including "and/or" unless the context clearly dictates otherwise.

Various methods and techniques described above provide a number of ways to carry out the invention. There is interchangeability of various features from different embodiments disclosed herein. Similarly, the various features and acts discussed above, as well as other known equivalents for each such feature or act, can be mixed and matched by one of ordinary skill in this art to perform methods in accordance with principles described herein. Additionally, the methods which are described and illustrated herein, such as methods of successively delivering fluids through beds, preparing media, or the like, are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A reactor unit, comprising:
a bed of desiccant; and
a reactive bed of particles for processing an effluent stream with pollutants, wherein each particle includes an adsorptive material and a reactive material, the adsorptive material is selected from at least one of activated carbon and zeolite, and the reactive material is selected from at least one of potassium permanganate and sodium hydroxide;
wherein the reactive bed includes zeolite impregnated with potassium permanganate and activated carbon impregnated with sodium hydroxide.

2. The reactor unit of claim 1 wherein the reactive bed is configured to remove contaminants in fluid flowing through the reactor unit to reduce the contaminants to less than about 100 ppb within an empty bed contact time of at least about 10 seconds.

3. The reactor unit of claim 1 wherein the reactive bed is configured to remove contaminants in fluid flowing through the reactor unit to reduce the amount of contaminants in the fluid by at least 95% by weight.

4. The reactor unit of claim 3 wherein the reactive material is adapted to remove at least one of styrene, formaldehyde, and phenols from the fluid as the fluid passes through the reactor unit.

5. The reactor unit of claim 1 wherein the particles are granules.

6. The reactor unit of claim 1 wherein the particles have a mesh size equal to or less than about 10.

7. The reactor unit of claim 1 wherein the particles have a mesh size in a range of about 4 to 6.

8. A reactor unit for processing an effluent stream with pollutants, the reactor unit comprising:
a bed of desiccant; and
a reactive bed of particles having a mesh size equal to or less than about 10,
wherein the particles each include
an adsorptive material selected from at least one of activated carbon or zeolite, and
a reactive material that is about 5% to about 8% of a combined weight of the reactive material and the adsorptive material, wherein the reactive material is selected from at least one of potassium permanganate or sodium hydroxide;
wherein the reactive bed includes zeolite impregnated with potassium permanganate and activated carbon impregnated with sodium hydroxide.

9. The reactor unit of claim 8 wherein the reactive material is potassium permanganate that is about 6% to about 8% of the combined weight of the reactive material and the adsorptive material.

10. The reactor unit of claim 8 wherein the reactive material is sodium hydroxide that is about 5% to about 8% of the combined weight of the reactive material and the adsorptive material.

11. The reactor unit of claim 8 wherein the reactive bed comprises 30% to 50% by volume of activated carbon impregnated with sodium hydroxide and about 50% to 70% by volume of zeolite impregnated with potassium permanganate.

12. The reactor unit of claim 8 wherein the reactive bed extends along most of a length of a flow path along which the effluent stream passes through the reactor unit.

13. A reactor unit, comprising:
a housing;
a desiccant in the housing; and
a reactive bed of particles configured to process an effluent flow that travels along a flow path through the reactor unit, wherein the reactive bed extends along most of a length of the flow path, and wherein the particles have a mesh size equal to or less than about 10 and include
an adsorptive material selected from at least one of activated carbon or zeolite, and
a reactive material that is about 5% to about 8% of a combined weight of the reactive material and the adsorptive material, wherein the reactive material is selected from at least one of potassium permanganate or sodium hydroxide, wherein the reactive bed includes zeolite impregnated with potassium permanganate and activated carbon impregnated with sodium hydroxide.

14. The reactor unit of claim 13, further comprising a partition between the desiccant and the reactive bed, wherein the reactive bed extends from the partition to an outlet through which the effluent stream exits the reactor unit.

15. The reactor unit of claim 13 wherein the reactive material is sodium hydroxide that is about 5% to about 8% of the combined weight of the reactive material and the adsorptive material.

* * * * *